US008817214B2

(12) United States Patent
Park

(10) Patent No.: US 8,817,214 B2
(45) Date of Patent: Aug. 26, 2014

(54) LIQUID CRYSTAL DISPLAY AND FABRICATING METHOD THEREOF

(75) Inventor: Mungi Park, Ansan-si (KR)

(73) Assignee: LG Display Co., Ltd., Seoul (KR)

( * ) Notice: Subject to any disclaimer, the term of this patent is extended or adjusted under 35 U.S.C. 154(b) by 400 days.

(21) Appl. No.: 12/894,012

(22) Filed: Sep. 29, 2010

(65) Prior Publication Data

US 2011/0075086 A1 Mar. 31, 2011

(30) Foreign Application Priority Data

Sep. 30, 2009 (KR) ........................ 10-2009-0093299

(51) Int. Cl.
*G02F 1/1343* (2006.01)
*G02F 1/1362* (2006.01)
*G02F 1/1333* (2006.01)

(52) U.S. Cl.
CPC ............ *G02F 1/1333* (2013.01); *G02F 1/1343* (2013.01); *G02F 1/1362* (2013.01)
USPC ....................................................... 349/141

(58) Field of Classification Search
USPC ........................................................ 349/141
See application file for complete search history.

(56) References Cited

U.S. PATENT DOCUMENTS 7,259,821 B2 * 8/2007 Kim .............................. 349/141

FOREIGN PATENT DOCUMENTS

CN 1482494 A 3/2004

* cited by examiner

*Primary Examiner* — James Dudek
(74) *Attorney, Agent, or Firm* — Birch, Stewart, Kolasch & Birch, LLP

(57) ABSTRACT

A liquid crystal display comprises a gate line formed on a first substrate, a data line formed on the substrate intersecting the gate line to define a pixel area, a common line partially surrounding the pixel area and formed along with the gate line by the same process, a thin film transistor formed at the intersection of the gate line and the data line, a common electrode having a common electrode horizontal section connected to the common line, and a common electrode finger section extending from the common electrode horizontal section with a finger shape, and a pixel electrode connected to the thin film transistor and generating a horizontal electric field along with the common electrode, wherein a part of the common electrode finger section overlaps the data line with a first passivation layer having a low dielectric and placed between the common electrode and the data line.

4 Claims, 16 Drawing Sheets

LIQUID CRYSTAL DISPLAY AND FABRICATING METHOD THEREOF

This application claims the benefit of Korea Patent Application No. 10-2009-0093299 filed on Sep. 30, 2009, which is incorporated herein by reference for all purposes as if fully set forth herein.

BACKGROUND

1. Field

This document relates to a liquid crystal display and a fabricating method thereof, and more particularly, to a liquid crystal display and a fabricating method thereof capable of increasing transmittance in pixels.

2. Related Art

A liquid crystal display ("LCD") displays images by adjusting a light transmittance of an LC layer using an electric field. The LCD is largely classified into a vertical field type and a horizontal field type by directions of the electric filed which drives the LC layer.

The vertical field type LCD drives a twisted nematic ("TN") mode LC layer by a vertical electric field generated between pixel electrodes and common electrodes arranged opposite to each other and provided on lower and upper panels, respectively. The vertical field type LCD has an advantage in a large aperture but a drawback in a small viewing angle.

The horizontal field type LCD drives an in plane switch ("IPS") mode LC layer by a horizontal electric field generated between a pixel electrode Ep and a common electrode Ec arranged in parallel on a lower panel GLS, as shown in FIG. 1. In order to generate the horizontal electric filed, the pixel electrode Ep and the common electric Ec are formed on the same plane. The pixel electrode Ep is electrically connected to a data line DL via a thin film transistor ("TFT") and is supplied with a data voltage from the data line DL. The pixel electrode Ep is electrically connected to a drain electrode of the TFT by passing through a passivation layer PAS. The common electrode Ec is electrically connected to a lower common line VL by passing through the passivation layer PAS and a gate insulating layer GI and is supplied with a common voltage from the lower common line VL.

In such a horizontal field type LCD, the passivation layer PAS is typically made of high dielectric materials, and thus when the common electrode Ec and the data line DL overlap each other with the passivation layer PAS therebetween, the parasitic capacitance Cap is formed. The parasitic capacitance reflects a voltage variation in the common electrode Ec on the common electrode Ec to make the potential in the common electrode Ec unstable, thereby causing a crosstalk. In order to suppress the crosstalk, in an LCD in relate art, the common electrode is required to be spaced apart from the data line DL by a predetermined distance D.

However, as the distance D between the common electrode Ec and the data line DL is increased, an area for an open block in the pixel area PA is decreased as much. In addition, a black matrix BM on the upper panel is required to be broaden by being enlarged by ΔW inwards the pixel area PA so as to cover the lower common line VL, and thereby the transmittance in the pixel is much reduced.

SUMMARY

Embodiments of the present invention provide a liquid crystal display and a fabricating method thereof capable of increasing transmittance in pixels.

According to an exemplary of the present invention, there is provided a liquid crystal display comprising a gate line formed on a first substrate, a data line formed on the substrate intersecting the gate line to define a pixel area, a common line partially surrounding the pixel area and formed along with the gate line by the same process, a thin film transistor formed at the intersection of the gate line and the data line, a common electrode having a common electrode horizontal section connected to the common line, and a common electrode finger section extending from the common electrode horizontal section with a finger shape, and a pixel electrode connected to the thin film transistor and generating a horizontal electric field along with the common electrode, wherein a part of the common electrode finger section overlaps the data line with a first passivation layer having a low dielectric and placed between the common electrode and the data line.

The first passivation layer may comprise acryl organic compound.

The liquid crystal display may further comprises a second passivation layer made of an inorganic insulating material and placed between the data line and the first passivation layer.

Also, the pixel electrode may comprise a pixel electrode horizontal section connected to the thin film transistor, and a pixel electrode finger section extending from the pixel electrode horizontal section in parallel to the common electrode finger section with a finger shape, wherein the common electrode finger section may comprise a first portion overlapping the data line and a second portion other than the first portion, and wherein the second portion of the common electrode finger section and the finger section of the pixel electrode may be directly disposed on the first substrate.

The liquid crystal display may further comprises a second substrate having a black matrix and arranged opposite to the first substrate, wherein the black matrix may cover the data line but may not cover the common line arranged in parallel to the data line.

According to an exemplary embodiment of the present invention, there is provided a method of fabricating a liquid crystal display, comprising forming by a first conductive pattern a gate line, a gate electrode of a thin film transistor connected to the gate line, and a common line separated from the gate line, forming by a second conductive pattern a data line intersecting the gate line to define a pixel area, a source electrode of the thin film transistor connected to the data line, and a drain electrode of the thin film transistor arranged opposite to the source electrode, entirely coating a first passivation layer having a low dielectric and patterning the first passivation layer to expose a part of the common line and a part of the drain electrode, forming by a third conductive pattern a common electrode including common electrode horizontal section connected to the exposed common line, and a common electrode finger section extending from the common electrode horizontal section with a finger shape, and forming by the third conductive pattern a pixel electrode connected to the exposed drain electrode to generate a horizontal electric field along with the common electrode in the pixel area, wherein a part of the common electrode finger section overlaps the data line with the first passivation layer placed between the common electrode and the data line.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 4A-1 to 4F-3 are sectional views sequentially illustrating the respective steps in the TFT panel fabricating method according to the first embodiment of the invention;

FIGS. 7A-1 to 7F-3 are sectional views sequentially illustrating the respective steps in the TFT panel fabricating method according to the second embodiment of the invention.

DETAILED DESCRIPTION

Hereinafter, exemplary embodiments of the invention will be described with reference to FIGS. 2 to 7F. The following embodiments will be described by exemplifying an IPS mode TFT array panel which is fabricated using a four-round mask process and a method of fabricating the same, but the scope of this document is not limited to the number of mask processes.

First Embodiment

A first embodiment of the invention will be described with reference to FIGS. 2 to 4F-3. In the first embodiment, a common electrode and a data line overlap each other by forming a passivation layer made of a low dielectric material between the common electrode and the data line.

Figure 1:
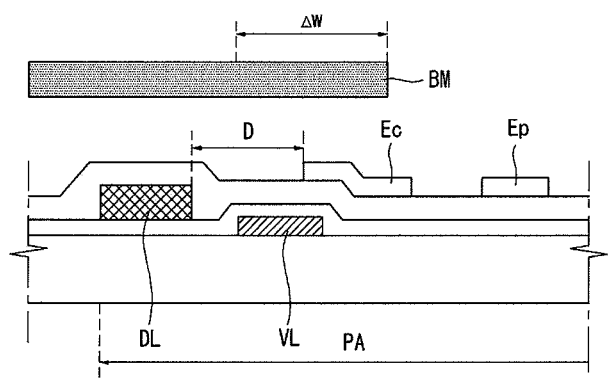
FIG. 1 is a diagram illustrating an LCD in related art, provided with a data line and a common electrode which are spaced apart from each other.
Figure 2:
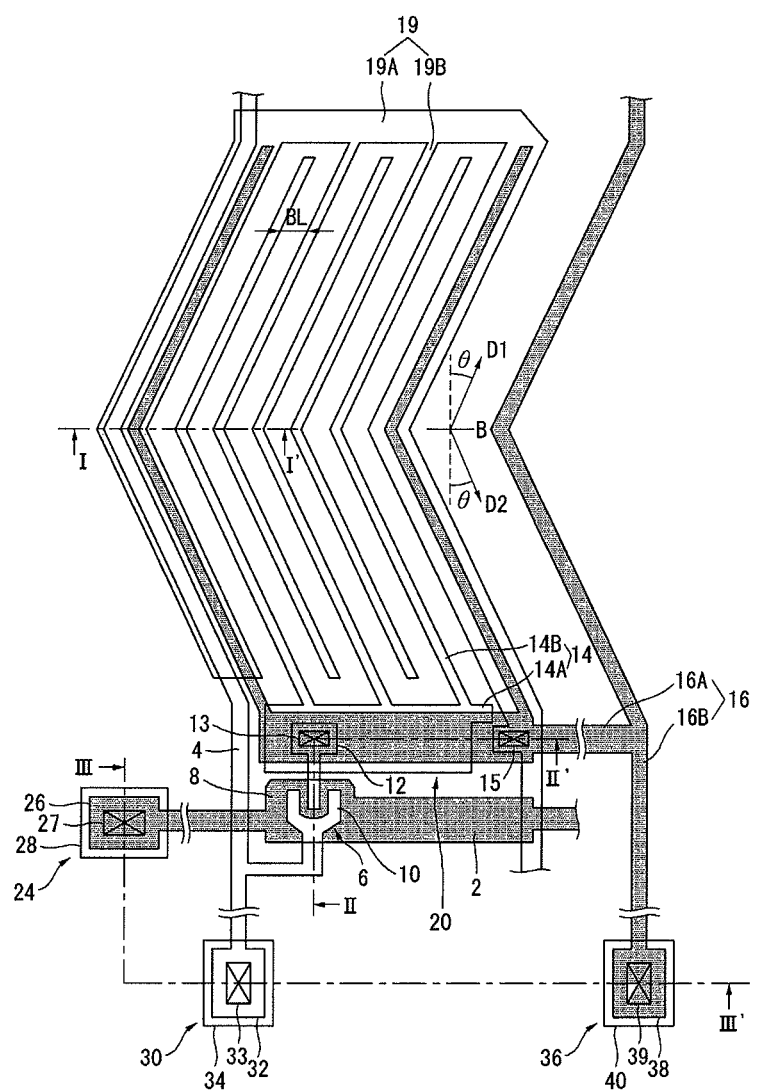
FIG. 2 is a plan view of a TFT array panel according to a first embodiment of the invention.
Figure 3A:
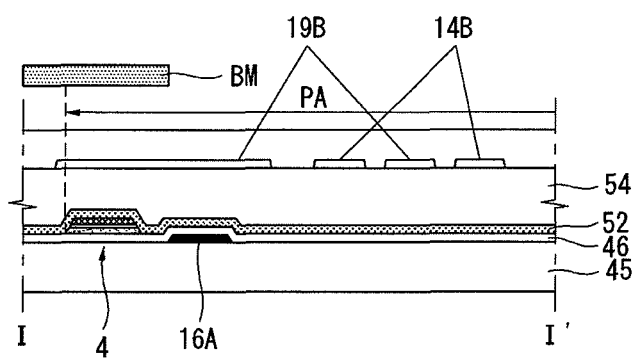
FIGS. 3A-3C are sectional views taken along the lines I-I', II-II' and in FIG. 2, respectively.
Figure 3B:
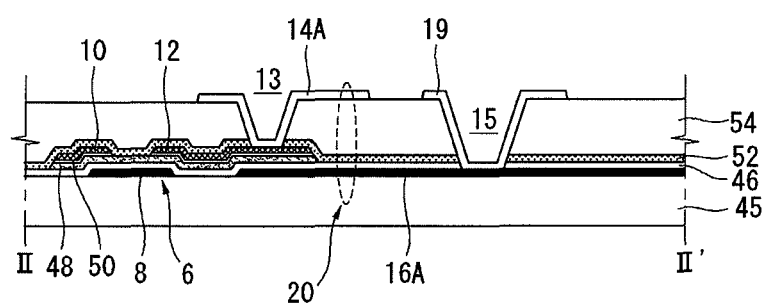
Figure 3C:
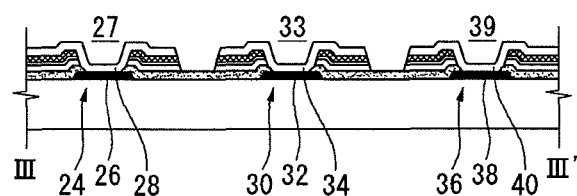

FIG. 2 is a plan view of a lower panel, that is, a TFT array panel formed by the four-round mask process according to the first embodiment of this document. FIGS. 3A-3C (collectively FIG. 3) are sectional views taken along the lines I-I', II-II' and III-III' in FIG. 2, respectively.

Figures 1, 4A:
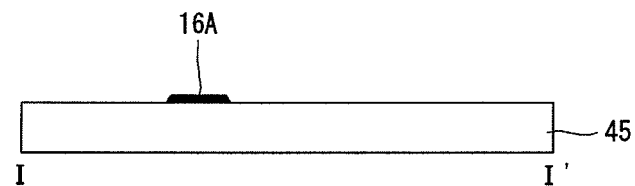
Figures 2, 4A:
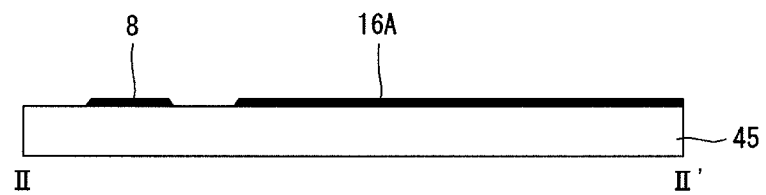
Figures 3, 4A:
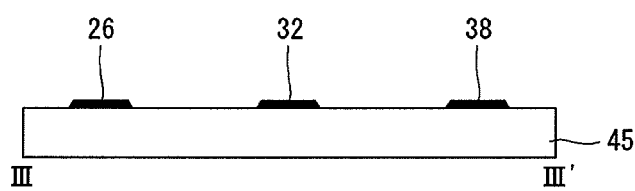

The TFT array panel shown in FIGS. 2 and 3 comprises a gate line 2 and a data line 4 with a gate insulating layer 46 therebetween, formed to intersect each other on a lower substrate 45, a TFT 6 which is formed at each intersection of the gate and data lines 2 and 4, a pixel electrode 14 and a common electrode 19 which are formed in a pixel region PA defined by the intersection of the gate and data lines 2 and 4 to generate a horizontal electric field, and, a common line 16 connected to the common electrode 19. In addition, the TFT array panel further comprises a storage capacitor 20 formed at an overlap portion between the common line 16 and the pixel electrode 14, a gate pad 24 connected to the gate line 2, a data pad 30 connected to the data line 4, and a common pad connected to the common line 16. In order to prevent an image distortion due to a viewing angle, the pixel area PA where images are displayed is divided into two domains D1 and D2. The pixel electrode 14 and the common electrode 19 are curved with the respect of a domain border line B partitioning the first and second domains D1 and D2. At this time, an electrode angle θ, formed by the electrodes 14 and 19 and the normal N perpendicular to the domain border line B, is the same in the respective domains D1 and D2. The electrode angle θ is determined by an initial design value.

The gate line 2 transmitting a gate signal and the data line 4 transmitting a data signal intersects each other with the gate insulating layer 46 therebetween to define the pixel area PA.

Here, the gate 2 line is formed by a first conductive pattern, and the data line 4 is formed by a second conductive pattern.

The common line 16 and the common electrode 19 transmit a reference voltage (common voltage) for driving an LC layer. The common line 16 includes an inner common line 16A which partially surrounds the pixel area PA in a display area where the pixels are disposed, and an outer common line 16B which connects the inner common lines 16A altogether in a non-display area outside the display area. The common line 16 is formed by the first conductive pattern.

The common electrode 19 includes a horizontal section 19A which is arranged in parallel to the gate line and is connected to the inner common line 16A via a second contact hole 15 passing through the gate insulating layer 46 and first and second passivation layers 52 and 54 (where the first passivation layer 52 may be omitted), and a finger section 19B which extends from the horizontal section 19A with a finger shape. The finger section 19B overlaps the data line 4 with the passivation layers 52 and 54 placed between the finger section 19B and the data line 4. The second passivation layer is made of a low dielectric material, and thereby the parasitic capacitance can be much reduced. As described above, the finger section 19B of the common electrode 19 overlaps the data line 4, and thereby an area for the open block BL is increased. Here, a black matrix BM on an upper panel is formed to cover the data line 4 but not to cover the inner common line 16A. In other words, the width of the black matrix BM extending inwards the pixel area PA is reduced. The open block BL is increased and the black matrix BM is decreased in width, and thereby the transmittance in the pixel is much increased. Meanwhile, the finger section 19B also overlaps the inner common line 16A. The common electrode 19 is formed by a third conductive pattern.

The TFT 6 responds to gate signals transmitted along the gate line 2 such that pixel signals transmitted along the data line 4 are charged to the pixel electrode 14. For this, the TFT 6 comprises a gate electrode 8 connected to the gate line 2, a source electrode 10 connected to the data line 4, and a drain electrode 12 connected to the pixel electrode 14. Furthermore, the TFT 6 comprises an active layer 48 overlapping the gate electrode 8 and the inner common line 16A with the gate insulating layer 46 placed between the TFT 6, and the gate electrode 8 and the inner common line 16A, thereby defining a channel between the source electrode 10 and the drain electrode 12, and an ohmic contact layer 50 formed on the active layer 48 except for the channel, for making ohmic contact with the source electrode 10 and the drain electrode 12. The active layer 48 and the ohmic contact layer 50 are formed by a semiconductor pattern.

The pixel electrode 14 is arranged in parallel and opposite to the common electrode 19 to generate a horizontal electric field in the pixel area PA. The pixel electrode 14 is connected to the drain electrode 12 via a first contact hole 13 passing through the passivation layers 52 and 54. The pixel electrode 14 includes a horizontal section 14A which is arranged in parallel to the neighboring gate line 2, and a finger section 14B which extends from the horizontal section 14A, arranged in parallel to the finger section 19B of the common electrode 19 in the pixel area PA and has a finger shape. The pixel electrode 14 is formed by the third conductive pattern.

The horizontal section 14A of the pixel electrode 14 partially overlaps the inner common line 16A with the gate insulating layer 46 and the passivation layers 52 and 54 placed therebetween to form the storage capacitor 20. The storage capacitor 20 stably maintains a pixel signal for a current frame charged in the pixel electrode 14 until a pixel signal for a next frame is charged in the pixel electrode 14.

The gate line 2 is connected to a gate driver (not shown) via the gate pad 24. The gate pad 24 consists of a gate pad lower electrode 26 extending from the gate line 2, and a gate pad upper electrode 28 connected, via a third contact hole 27 passing through the gate insulating layer 46, to the gate pad lower electrode 26. The gate pad lower electrode 26 is formed by the first conductive pattern, and the gate pad upper electrode 28 is formed by the third conductive pattern.

The data line 4 is connected to a data driver (not shown) via the data pad 30. The data pad 30 consists of a lower data pad electrode 32 extending from the data line 4, and an upper data pad electrode 34 connected, via a fourth contact hole 33 passing through the gate insulating layer 46, to the lower data pad electrode 32. The data pad lower electrode 32 is formed by the first conductive pattern, and the data pad upper electrode 34 is formed by the third conductive pattern.

The common line 16 is connected to an external reference voltage source (not shown) via the common pad 36. The common pad 36 consists of a common pad lower electrode 38 extending from the outer common line 16B, and a common pad upper electrode 40 connected, via a fifth contact hole 39 passing through the gate insulating layer 46, to the common pad lower electrode 38. The common pad upper electrode 38 is formed by the first conductive pattern, and the common pad upper electrode 40 is formed by the third conductive pattern.

The third conductive pattern forming the pixel electrode 14, the common electrode 19, and the pad upper electrodes 28, 34 and 40 may be formed of a transparent conductive film or a metal film. In addition, the third conductive pattern may further be formed of a low reflective film so as to prevent dazzling due to external light.

A method of fabricating the TFT panel with the above-described configuration will be described with reference to FIGS. 4A-1 to 4A-3 (collectively FIG. 4A), 4B-1 to 4B-3 (collectively FIG. 4B), 4C-1 to 4C-3 (collectively FIG. 4C), 4D-1 to 4D-3 (collectively FIG. 4D), 4E-1 to 4E-3 (collectively FIG. 4E) and 4F-1 to 4F-3 (collectively FIG. 4F).

Referring to FIG. 4A, a first conductive pattern group including the gate line 2, the gate electrode 8, the gate pad lower electrode 26, the data pad lower electrode 32, the common line 16, and the common pad lower electrode 38 is formed on the lower substrate 45 using a first mask process.

In detail, a first conductive material is coated on the lower substrate 45 by a deposition method, such as a sputtering or the like. Subsequently, the first conductive material is patterned by a photolithography and an etching using the first mask to form the first conductive pattern group including the gate line 2, the gate electrode 8, the gate pad lower electrode 26, the data pad lower electrode 32, the common line 16, and the common pad lower electrode 38. The first conductive material may employ Cr, MoW, MoTi, Cr/Al, Cu, Al(Nd), Mo/Al, Mo/Al(Nd), Cr/Al(Nd), or the like.

Figures 1, 4B:
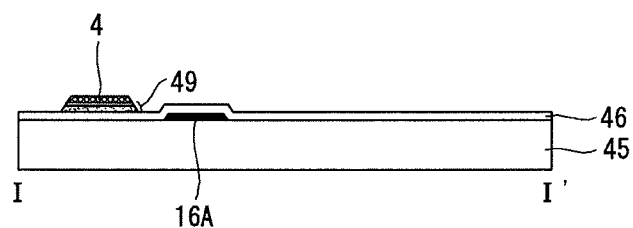
Figures 2, 4B:
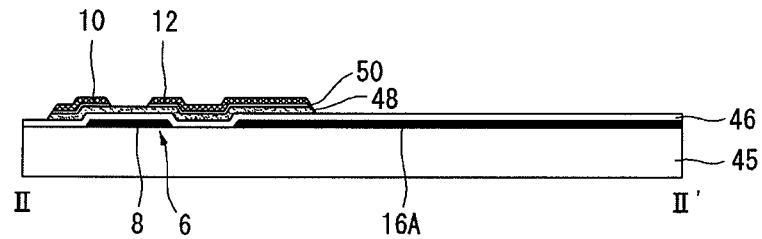
Figures 3, 4B:
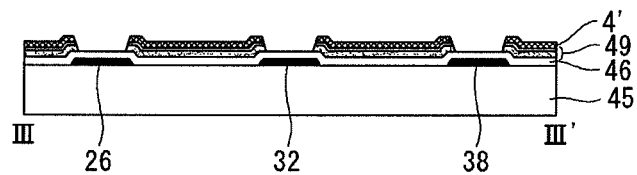

In FIG. 4B, a gate insulating layer 46 is coated on the lower substrate 45 provided with the first conductive pattern group by a deposition method, such as a PECVD or a sputtering. The gate insulating layer 46 may be made of an inorganic insulating material, such as a silicon oxide ($SiO_x$) or a silicon nitride ($SiN_x$). Next, a semiconductor pattern including the active layer 48 and the ohmic contact layer 50, and a second conductive pattern group including the data line 4, the source electrode 10, and the drain electrode 12, are formed on the gate insulating layer 46 by a second mask process.

For example, an amorphous silicon layer, an n+ amorphous silicon layer, and a second conductive material are sequentially coated on the lower substrate 45 provided with the gate insulating layer 46 by a deposition method, such as a PECVD and a sputtering. The second conductive material may employ Cr, MoW, MoTi, Cr/Al, Cu, Al(Nd), Mo/Al, Mo/Al(Nd), Cr/Al(Nd) or the like. Next, a photoresist pattern is formed on the second conductive material by a photolithography using a second mask. The second mask uses a diffractive exposure mask or a translucent mask having a diffractive exposure portion corresponding to a channel region of the TFT. Thus, the photoresist pattern of the channel portion has a lower height than other photoresist patterns corresponding to other regions. Subsequently, the second conductive material is patterned by a wet etching using the photoresist pattern to provide the second conductive pattern group including the data line 4, the source electrode 10, the drain electrode 12, which is integral to the source electrode 10, and a second conductive layer 4' of the pad portion. Next, the n+ amorphous silicon layer and the amorphous silicon layer are simultaneously patterned by a dry etching using the same photoresist pattern to provide the ohmic contact layer 50, the active layer 48, a semiconductor layer underlying the data line 4, and the semiconductor layer 49 underlying the second conductive layer 4' of the pad portion. The photoresist pattern having the relatively lower height within the channel portion is removed by an ashing using an oxygen ($O_2$) plasma. Thereafter, the second source/drain metal layer and the ohmic contact layer 50 formed at the channel portion are removed by a dry etching. Accordingly, the active layer 48 of the channel portion is exposed to electrically separate the source electrode 10 from the drain electrode 12.

Figures 1, 4C:
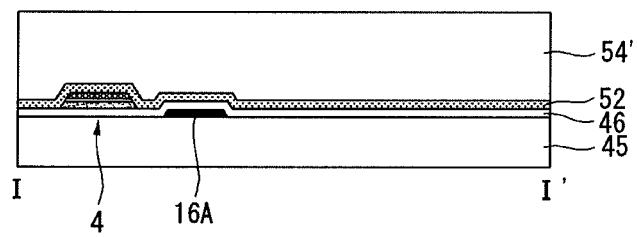
Figures 2, 4C:
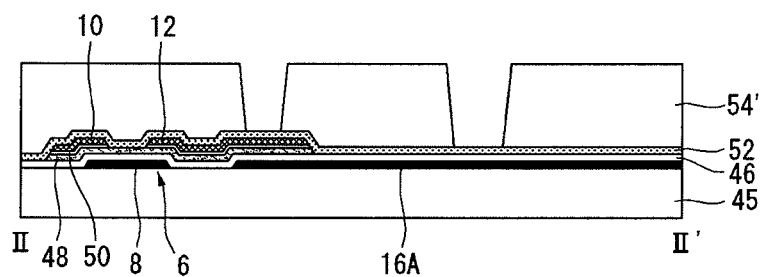
Figures 3, 4C:
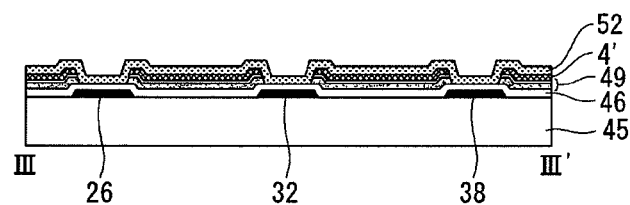
Figures 1, 4D:
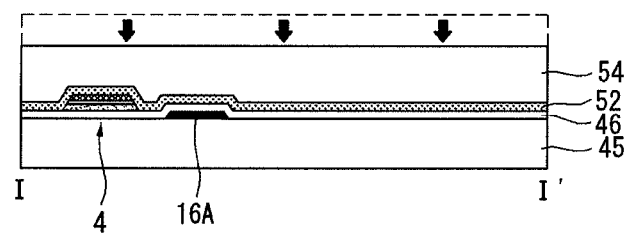
Figures 2, 4D:
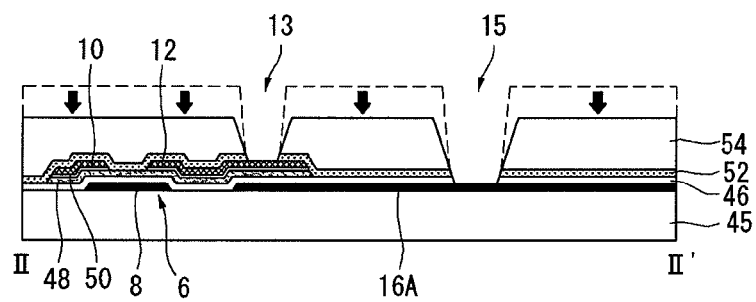
Figures 3, 4D:
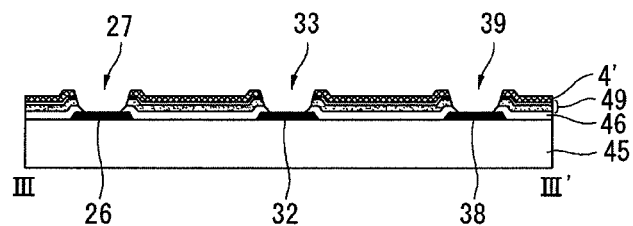

In FIGS. 4C and 4D, the first and second passivation layers 52 and 54, and the first to fifth contact holes 13, 15, 27, 33 and 39 passing through the passivation layers 52 and 54, are formed on the lower substrate 45 provided with the second conductive pattern group using a third mask process.

For example, as shown in FIG. 4C, the first passivation layer 52 is entirely coated on the lower substrate 45 provided with the second conductive pattern group by a deposition method, such as a PECVD or the like. The first passivation layer 52 may be made of an inorganic insulating material such as $SiO_x$, $SiN_x$ or the like. The forming process of the first passivation layer 52 may be omitted. Subsequently, the second passivation layer 54 is entirely formed on the lower substrate 45 provided with the first passivation layer 52 by a coating method such as a spin coating, a slit coating, or the like. The second passivation layer 54 may be made of a low dielectric material such as acryl organic compound or the like. The second passivation layer 54 functions to reduce the parasitic capacitance when the underlying data line 4 and the overlying common electrode 19 overlap each other. Successively, the second passivation layer 54 is removed from portions where the first and second contact holes will be formed and portions where the pads 24, 30 and 36 will be formed, by a photolithography using a third mask.

As shown in FIG. 4D, the first to fifth contact holes 13, 15, 27, 33 and 39 are formed by a dry etching using the second passivation layer 54 pattern as a mask. The first contact hole 13 passes through the passivation layers 52 and 54 to expose the drain electrode 12, and the second contact hole 15 passes through the passivation layers 52 and 54 and the gate insulating layer 46 to expose the inner common line 16A. The third contact hole 27 passes through the gate insulating layer 46 to expose the gate pad lower electrode 26, and the fourth contact hole 33 passes through the gate insulating layer 46 to expose the data pad lower electrode 32. The fifth contact hole 39 passes through the gate insulating layer 46 to expose the common pad lower electrode 38.

Figures 1, 4E:
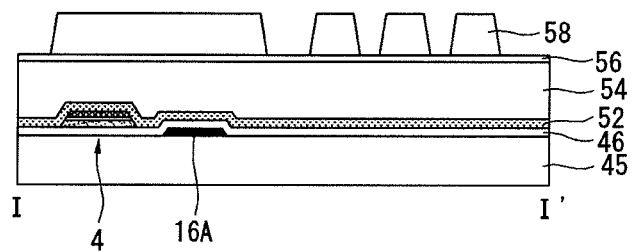
Figures 2, 4E:
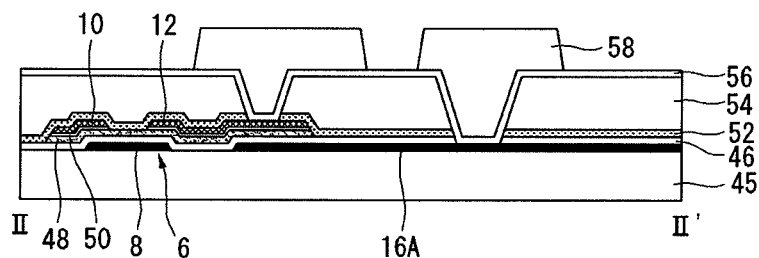
Figures 3, 4E:
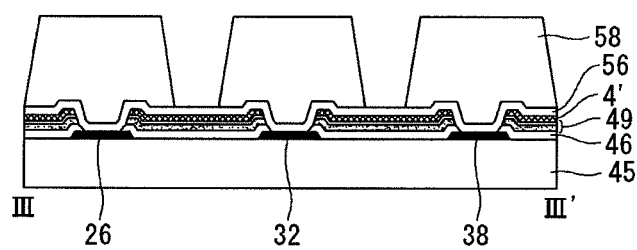
Figures 1, 4F:
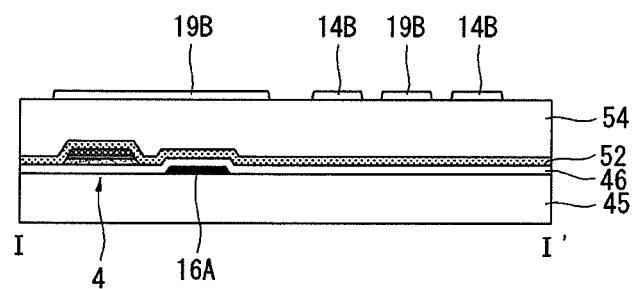
Figures 2, 4F:
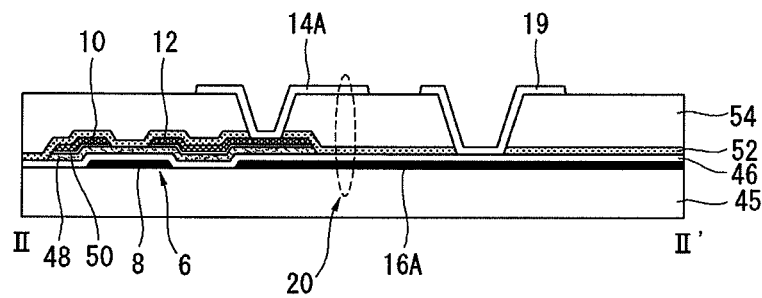
Figures 3, 4F:
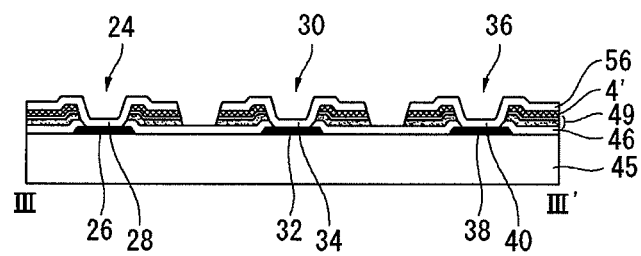

In FIGS. 4E and 4F, a third conductive pattern group including the pixel electrode 14, the common electrode 19, the gate pad upper electrode 28, the data pad upper electrode 34, and the common pad upper electrode 40 is formed on the lower substrate 45 provided with the contact holes 13, 15, 27, 33 and 39 using a fourth mask process.

For example, as shown in FIG. 4E, a third conductive material 56 is coated on the lower substrate 45 provided with the passivation layers 52 and 54 including the contact holes 13, 15, 27, 33 and 39 by a deposition method such as a sputtering or the like. The third conductive material may employ a transparent conductive material such as ITO, IZO, TO or the like, or a metal material such as Cr, MoW, MoTi, Cr/Al, Cu, Al(Nd), Mo/Al, Mo/Al(Nd), Cr/Al(Nd), or the like. The third conductive material 56 may also employ a low reflective material including a nitride containing material or an oxide containing material. Subsequently, a photoresist pattern 58 is formed on the third conductive material 56 using a third mask.

The third conductive material 56 is patterned by a wet etching using the photoresist pattern 58 as a mask to provide a third conductive pattern group including, as shown in FIG. 4F, the pixel electrode 14, the common electrode 19, the gate pad upper electrode 28, the data pad upper electrode 34 and the common pad upper electrode 40. The pixel electrode 14 is electrically connected to the drain electrode 12 of the TFT via the first contact hole 13. The common electrode 19 is electrically connected to the inner common line 16A via the second contact hole 15. The gate pad upper electrode 28 is electrically connected to the gate pad lower electrode 26 via the third contact hole 27. The data pad upper electrode 34 is electrically connected to the data pad lower electrode 32 via the fourth contact hole 33. The common pad upper electrode 40 is electrically connected to the common pad lower electrode 38 via the fifth contact hole 39.

As above, in the LCD and the fabrication method thereof according to the first embodiment of this document, the passivation layers made of the low dielectric material are formed between the common electrode and the data line so as to overlap the common electrode and the data line. As a result, an area for the open block in the pixel area is increased, and also an overlap area between the black matrix and the pixel area is reduced. Therefore, the transmittance in the pixel is much increased.

Second Embodiment

A second embodiment according to the invention will be described with reference to FIGS. 5 to 7F-3. The second embodiment forms passivation layers made of a low dielectric material between the a common electrode and a data line so as to overlap the common electrode and the data line, and moreover directly forms a part of the common electrode and a finger section of a pixel electrode on a substrate.

Figure 5:
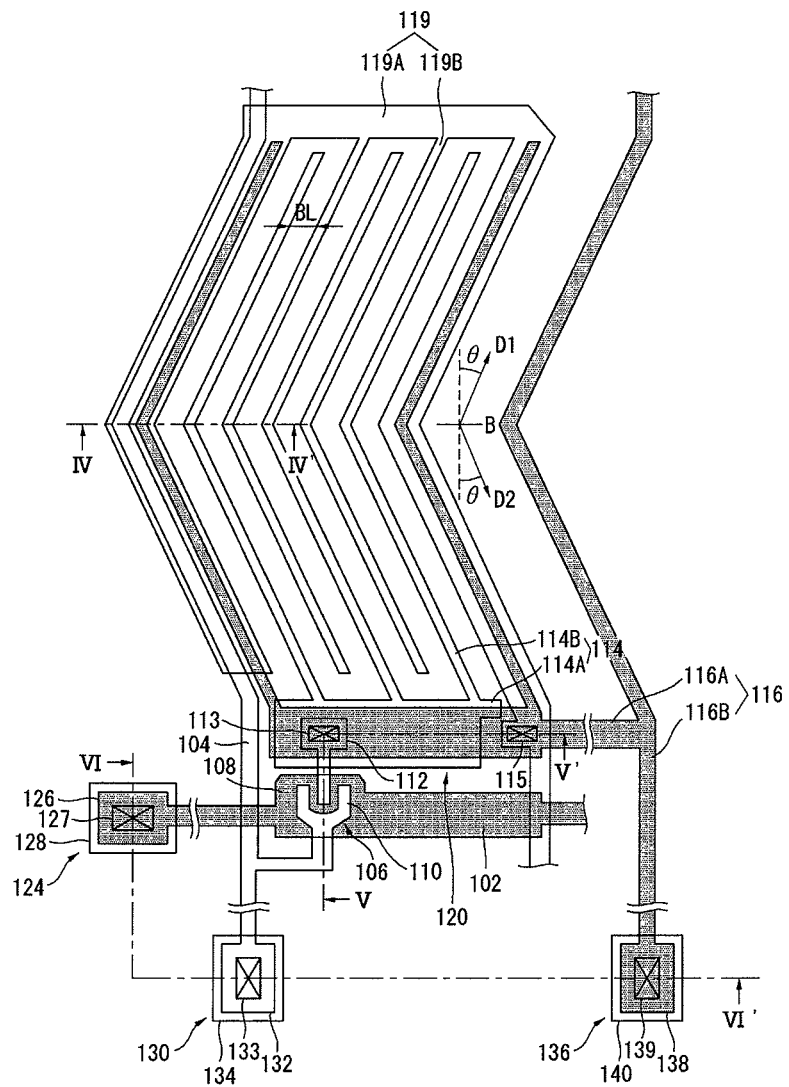
FIG. 5 is a plan view of a TFT array panel according to a second embodiment of the invention.
Figure 6A:
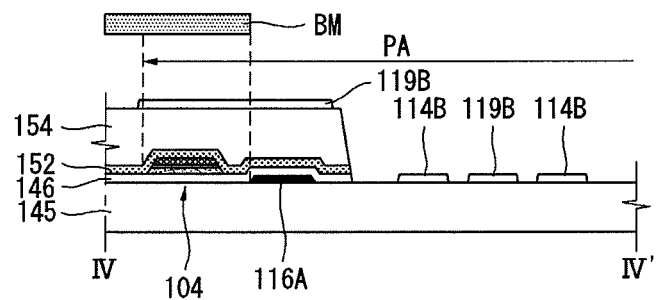
FIGS. 6A-6C are sectional views taken along the lines IV-IV', V-V' and VI-VI' in FIG. 5.
Figure 6B:
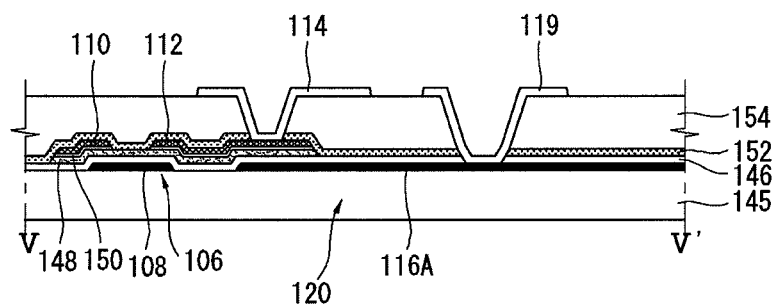
Figure 6C:
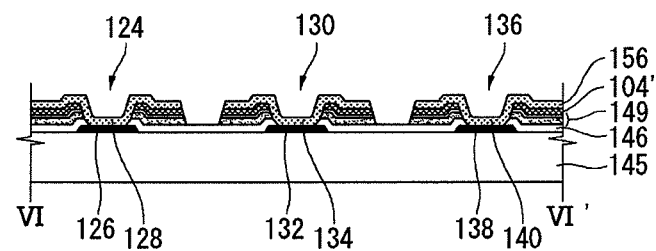

FIG. 5 is a plan view of a lower panel, that is, a TFT array panel formed by the four-round mask process according to the second embodiment of this document. FIGS. 6A-6C (collectively FIG. 6) are sectional view taken along the lines IV-IV', V-V' and VI-VI' in FIG. 5.

The TFT array panel shown in FIGS. 5 and 6 comprises a gate line 102 and a data line 104 with a gate insulating layer 146 therebetween, formed to intersect each other on a lower substrate 145, a TFT 106 which is formed at each intersection of the gate and data lines 102 and 104, a pixel electrode 114 and a common electrode 119 which are formed in a pixel region PA defined by the intersection of the gate and data lines 102 and 104 to generate a horizontal electric field, and, a common line 116 connected to the common electrode 119. In addition, the TFT array panel further comprises a storage capacitor 120 formed at an overlap portion between the common line 16 and the pixel electrode 114, a gate pad 24 connected to the gate line 102, a data pad 130 connected to the data line 104, and a common pad connected to the common line 116. In order to prevent an image distortion due to a viewing angle, the pixel area PA where images are displayed is divided into two domains D1 and D2. The pixel electrode 114 and the common electrode 119 are curved with the respect of a domain border line B partitioning the first and second domains D1 and D2. At this time, an electrode angle θ, formed by the electrodes 114 and 119 and the normal N perpendicular to the domain border line B, is the same in the respective domains D1 and D2. The electrode angle θ is determined by an initial design value.

The gate line 102 transmitting a gate signal and the data line 104 transmitting a data signal intersects each other with the gate insulating layer 146 therebetween to define the pixel area PA. Here, the gate 102 line is formed by a first conductive pattern, and the data line 104 is formed by a second conductive pattern.

The common line 116 and the common electrode 119 transmit a reference voltage (common voltage) for driving an LC layer. The common line 116 includes an inner common line 116A which partially surrounds the pixel area PA in a display area where the pixels are disposed, and an outer common line 116B which connects the inner common lines 116A altogether in a non-display area outside the display area. The common line 116 is formed by the first conductive pattern.

The common electrode 119 includes a horizontal section 119A which is arranged in parallel to the gate line 102 and is connected to the inner common line 116A via a second contact hole 115 passing through the gate insulating layer 146 and first and second passivation layers 152 and 154 (where the first passivation layer 152 may be omitted), and a finger section 119B which extends from the horizontal section 119A and has a finger shape. The finger section 19B overlaps the data line 104 with the passivation layers 152 and 54 placed between the finger section 19B and the data line 104. The second passivation layer is made of a low dielectric material, and thereby the parasitic capacitance can be much reduced. As described above, the finger section 119B of the common electrode overlaps the data line 104, and thereby an area for the open block BL is increased. Here, a black matrix BM on an upper panel is formed to cover the data line 104 but not to cover the inner common line 116A. In other words, the width of the black matrix BM extending inwards the pixel area PA is reduced. The open block BL is increased and the black matrix BM is decreased in width, and thereby the transmittance in the pixel is much increased.

Meanwhile, the finger section 119B includes not only a first portion overlapping the data line 104 over the gate insulating layer 146 and the passivation layers 152 and 154, but also a second portion. The second portion of the finger section 119B is directly formed on the substrate 145. The horizontal section 119A is over the gate insulating layer 146 and the passivation layers 152 and 154. The common electrode 119 is formed by a third conductive pattern.

The TFT 106 responds to gate signals transmitted along the gate line 102 such that pixel signals transmitted along the data line 104 are charged to the pixel electrode 114. For this, the TFT 106 comprises a gate electrode 108 connected to the gate line 102, a source electrode 110 connected to the data line 104, and a drain electrode 112 connected to the pixel electrode 114. Furthermore, the TFT 106 comprises an active layer 148 overlapping the gate electrode 108 and the inner common line 116A with the gate insulating layer 146 placed between the TFT 106, and the gate electrode 8 and the inner common line 116A, thereby defining a channel between the source electrode 110 and the drain electrode 112, and an ohmic contact layer 150 formed on the active layer 148 except for the channel, for making ohmic contact with the source electrode 110 and the drain electrode 112. The active layer 148 and the ohmic contact layer 150 are formed by a semiconductor pattern.

The pixel electrode 114 is arranged in parallel to and opposite to the common electrode 119 to generate a horizontal electric field in the pixel area PA. The pixel electrode 114 is connected to the drain electrode 112 via a first contact hole 113 passing through the passivation layers 152 and 154. The pixel electrode 114 includes a horizontal section 114A which is arranged in parallel to the neighboring gate line 102, and a finger section 114B which extends from the horizontal section 114A, arranged in parallel to the finger section 119B of the common electrode 119 in the pixel area PA and has a finger shape. The finger section 114B is directly formed on the substrate 145 along with a part of the finger section 119B of the common electrode 119. As a result, there are no gate insulating layer 146 and the passivation layers 152 and 154 in the light transmitting area including the open block BL, and thereby the transmittance in the pixel is more increased. The pixel electrode 114 is formed by the third conductive pattern.

The horizontal section 114A of the pixel electrode 114 partially overlaps the inner common line 116A with the gate insulating layer 146 and the passivation layers 152 and 154 placed therebetween to form the storage capacitor 120. The storage capacitor 120 stably maintains a pixel signal for a current frame charged in the pixel electrode 114 until a pixel signal for a next frame is charged in the pixel electrode 114.

The gate line 102 is connected to a gate driver (not shown) via the gate pad 124. The gate pad 124 consists of a gate pad lower electrode 126 extending from the gate line 102, and a gate pad upper electrode 128 connected, via a third contact hole 127 passing through the gate insulating layer 146, to the gate pad lower electrode 126. The gate pad lower electrode 126 is formed by the first conductive pattern, and the gate pad upper electrode 128 is formed by the third conductive pattern.

The data line 104 is connected to a data driver (not shown) via the data pad 130. The data pad 130 consists of a lower data pad electrode 32 extending from the data line 104, and an upper data pad electrode 134 connected, via a fourth contact hole 133 passing through the gate insulating layer 146, to the lower data pad electrode 132. The data pad lower electrode 132 is formed by the first conductive pattern, and the data pad upper electrode 134 is formed by the third conductive pattern.

The common line 116 is connected to an external reference voltage source (not shown) via the common pad 136. The common pad 136 consists of a common pad lower electrode 138 extending from the outer common line 116B, and a common pad upper electrode 140 connected, via a fifth contact hole 139 passing through the gate insulating layer 146, to the common pad lower electrode 138. The common pad upper electrode 138 is formed by the first conductive pattern, and the common pad upper electrode 140 is formed by the third conductive pattern.

The third conductive pattern forming the pixel electrode 114, the common electrode 119, and the pad upper electrodes 128, 134 and 140 may be formed of a transparent conductive film or a metal film. In addition, the third conductive pattern may further be formed of a low reflective film so as to prevent dazzling due to external light.

A method of fabricating the TFT panel with the above-described configuration will be described with reference to FIGS. 7A-1 to 7A-3 (collectively FIG. 7A), 7B-1 to 7B-3 (collectively FIG. 7B), 7C-1 to 7C-3 (collectively FIG. 7C), 7D-1 to 7D-3 (collectively FIG. 7D), 7E-1 to 7E-3 (collectively FIG. 7E) and 7F-1 to 7F-3 (collectively FIG. 7F).

Figures 1, 7A:
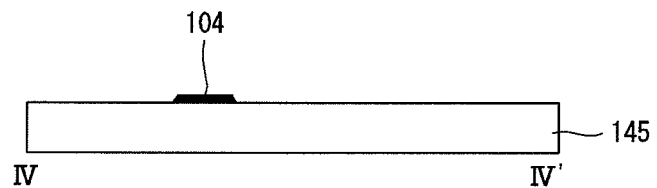
Figures 2, 7A:
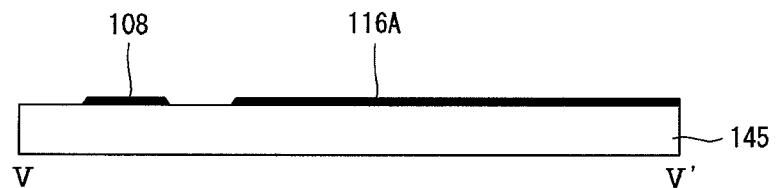
Figures 3, 7A:
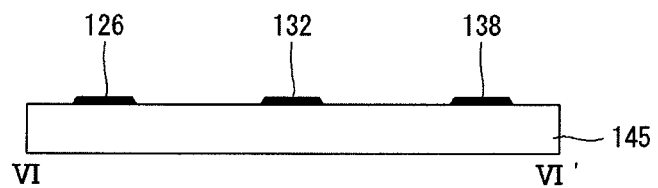

Referring to FIG. 7A, a first conductive pattern group including the gate line 102, the gate electrode 108, the gate pad lower electrode 126, the data pad lower electrode 132, the common line 116, and the common pad lower electrode 138 is formed on the lower substrate 145 using a first mask process.

In detail, a first conductive material is coated on the lower substrate 145 by a deposition method, such as sputtering or the like. Subsequently, the first conductive material is patterned by a photolithography and an etching using the first mask to form the first conductive pattern group including the gate line 102, the gate electrode 108, the gate pad lower electrode 126, the data pad lower electrode 132, the common line 116, and the common pad lower electrode 138. The first conductive material may employ Cr, MoW, MoTi, Cr/Al, Cu, Al(Nd), Mo/Al, Mo/Al(Nd), Cr/Al(Nd), or the like.

Figures 1, 7B:
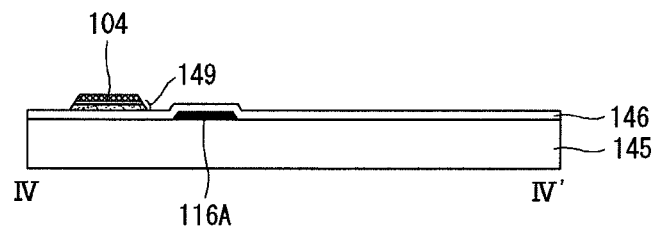
Figures 2, 7B:
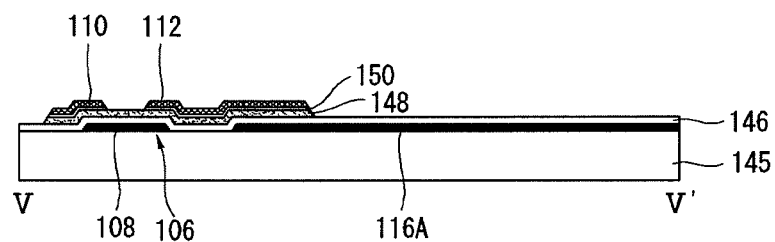
Figures 3, 7B:
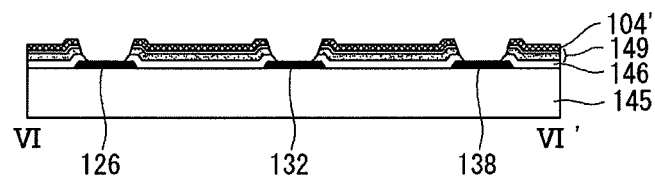

In FIG. 7B, a gate insulating layer 46 is coated on the lower substrate 145 provided with the first conductive pattern group by a deposition method, such as PECVD or sputtering. The gate insulating layer 146 may be made of an inorganic insulating material, such as $SiO_x$ or $SiN_x$. Next, a semiconductor pattern including the active layer 148 and the ohmic contact layer 150, and a second conductive pattern group including the data line 104, the source electrode 110, and the drain electrode 112, are formed on the gate insulating layer 146 by a second mask process.

For example, an amorphous silicon layer, an n+ amorphous silicon layer, and a second conductive material are sequentially coated on the lower substrate 145 provided with the gate insulating layer 146 by deposition techniques, such as PECVD and sputtering. The second conductive material may employ Cr, MoW, MoTi, Cr/Al, Cu, Al(Nd), Mo/Al, Mo/Al (Nd), Cr/Al(Nd) or the like. Next, a photoresist pattern is formed on the second conductive material by a photolithography using a second mask. The second mask uses a diffractive exposure mask or a translucent mask having a diffractive exposure portion corresponding to a channel region of the TFT. Thus, a photoresist pattern of the channel portion has a lower height than other photoresist patterns corresponding to other regions. Subsequently, the second conductive material is patterned by a wet etching using the photoresist pattern to provide the second conductive pattern group including the data line 104, the source electrode 110, the drain electrode 112, which is integral to the source electrode 110, and a second conductive layer 104' of the pad portion. Next, the n+ amorphous silicon layer and the amorphous silicon layer are simultaneously patterned by a dry etching using the same photoresist pattern to provide the ohmic contact layer 150, the active layer 148, a semiconductor layer underlying the data line 104, and the semiconductor layer 149 underlying the second conductive layer 104' of the pad portion. The photoresist pattern having the relatively lower height within the channel portion is removed by an ashing using an oxygen ($O_2$) plasma. Thereafter, the second source/drain metal layer and the ohmic contact layer 150 formed at the channel portion are removed by a dry etching. Accordingly, the active layer 148 of the channel portion is exposed to electrically separate the source electrode 110 from the drain electrode 112.

Figures 1, 7C:
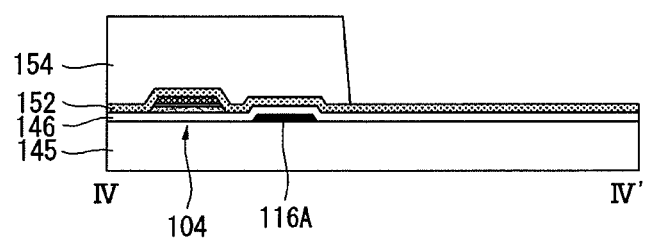
Figures 2, 7C:
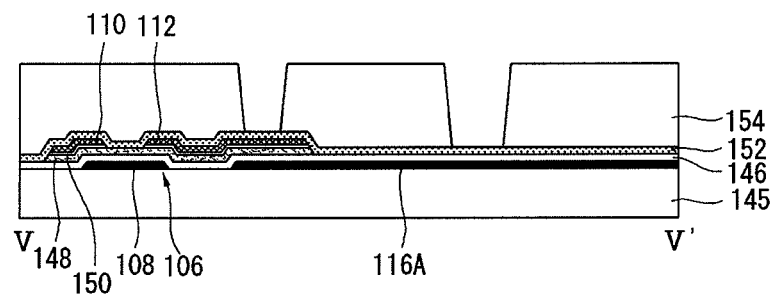
Figures 3, 7C:
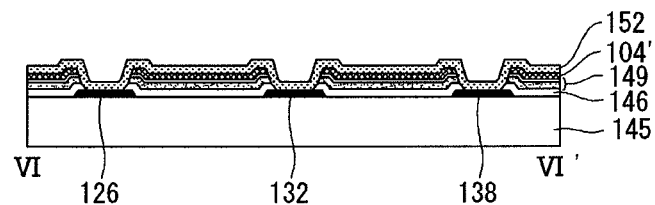
Figures 1, 7D:
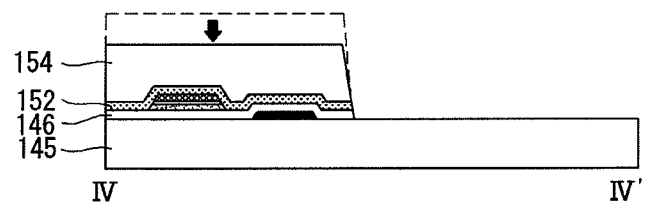
Figures 2, 7D:
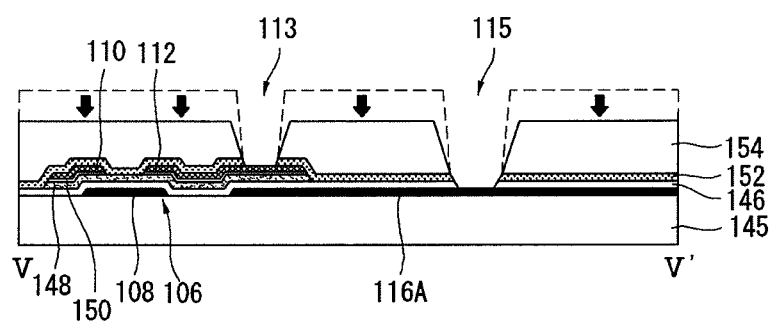
Figures 3, 7D:
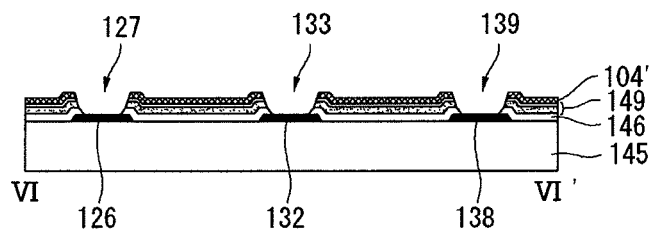

In FIGS. 7C and 7D, the first and second passivation layers 152 and 154, and the first to fifth contact holes 113, 115, 127, 133 and 139 passing through the passivation layers 152 and 154, are formed on the lower substrate 145 provided with the second conductive pattern group using a third mask process.

For example, as shown in FIG. 7C, the first passivation layer 152 is entirely coated on the lower substrate 145 provided with the second conductive pattern group by a deposition method, such as a PECVD or the like. The first passivation layer 152 may be made of an inorganic insulating material such as $SiO_x$, $SiN_x$ or the like. The forming process of the first passivation layer 52 may be omitted. Subsequently, the second passivation layer 154 is entirely formed on the lower substrate 145 provided with the first passivation layer 152 by a coating method such as a spin coating, a slit coating, or the like. The second passivation layer 154 may be made of a low dielectric material such as acryl organic compound or the like. The second passivation layer 154 functions to reduce the parasitic capacitance when the underlying data line 104 and the overlying common electrode 119 overlap each other. Successively, the second passivation layer 154 is removed from portions where the first and second contact holes will be formed and portions where the pads 124, 130 and 136 will be formed by a photolithography using a third mask.

As shown in FIG. 7D, the first to fifth contact holes 113, 115, 127, 133 and 139 are formed by a dry etching using the second passivation layer 154 pattern as a mask. The first contact hole 113 passes through the passivation layers 152 and 154 to expose the drain electrode 112, and the second contact hole 115 passes through the passivation layers 152 and 154 and the gate insulating layer 146 to expose the inner common line 116A. The third contact hole 127 passes through the gate insulating layer 146 to expose the gate pad lower electrode 126, and the fourth contact hole 133 passes through the gate insulating layer 146 to expose the data pad lower electrode 132. The fifth contact hole 139 passes through the gate insulating layer 146 to expose the common pad lower electrode 138.

Figures 1, 7E:
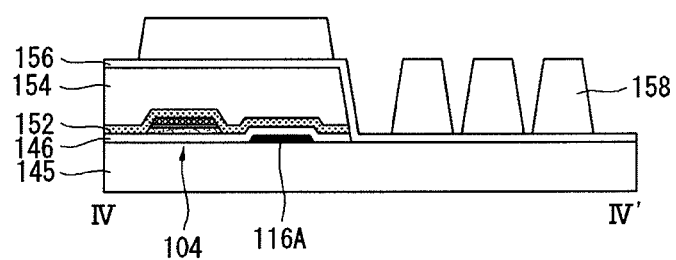
Figures 2, 7E:
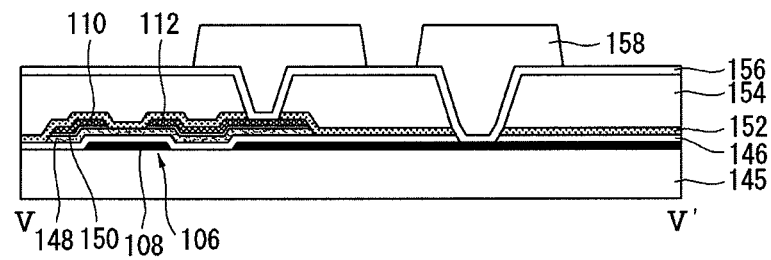
Figures 3, 7E:
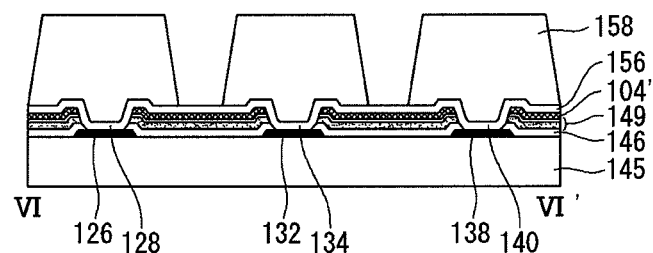
Figures 1, 7F:
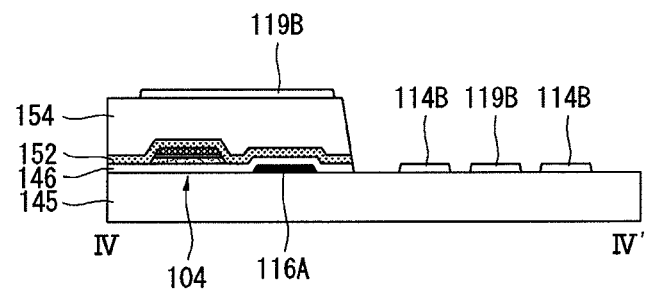
Figures 2, 7F:
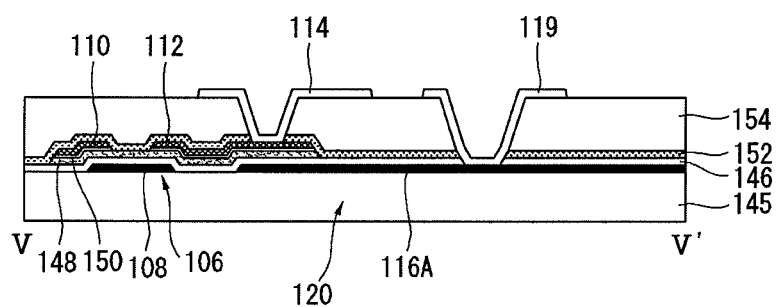
Figures 3, 7F:
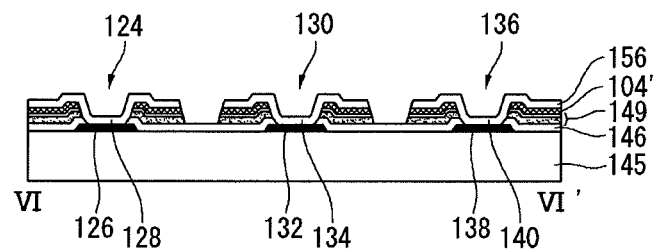

In FIGS. 7E and 7F, a third conductive pattern group including the pixel electrode 114, the common electrode 119, the gate pad upper electrode 128, the data pad upper electrode 134, and the common pad upper electrode 140 is formed on the lower substrate 145 provided with the contact holes 113, 115, 127, 133 and 139 using a fourth mask process.

For example, as shown in FIG. 7E, a third conductive material 156 is coated on the lower substrate 145 provided with the passivation layers 152 and 154 including the contact holes 113, 115, 127, 133 and 139 by a deposition method such as a sputtering or the like. The third conductive material may employ a transparent conductive material such as ITO, IZO, TO or the like, or a metal material such as Cr, MoW, MoTi, Cr/Al, Cu, Al(Nd), Mo/Al, Mo/Al(Nd), Cr/Al(Nd), or the like. The third conductive material 156 may also employ a low reflective material including a nitride containing material or an oxide containing material. Subsequently, a photoresist pattern 158 is formed on the third conductive material 156 using a third mask.

The third conductive material 156 is patterned by a wet etching using the photoresist pattern 158 as a mask to provide a third conductive pattern group including, as shown in FIG. 7F, the pixel electrode 114, the common electrode 119, the gate pad upper electrode 128, the data pad upper electrode 134 and the common pad upper electrode 140. The pixel electrode 114 is electrically connected to the drain electrode 112 of the TFT via the first contact hole 113. The common electrode 119 is electrically connected to the inner common line 116A via the second contact hole 115. The gate pad upper electrode 128 is electrically connected to the gate pad lower electrode 126 via the third contact hole 127. The data pad upper electrode 134 is electrically connected to the data pad lower electrode 132 via the fourth contact hole 133. The common pad upper electrode 140 is electrically connected to the common pad lower electrode 138 via the fifth contact hole 139. The finger section 114B of the pixel electrode 114 and a part of the finger section 119B of the common electrode 119 are directly formed on the substrate 145. As a result, there are no gate insulating layer 146 and the passivation layers 152 and 154 in the light transmitting area including the open block BL, and thereby the transmittance in the pixel is more increased.

As above, in the LCD and the fabrication method thereof according to the second embodiment of this document, the passivation layers made of the low dielectric material are formed between the common electrode and the data line so as to overlap the common electrode and the data line. As a result, an area for the open block in the pixel area is increased, and also an overlap area between the black matrix and the pixel area is reduced. Therefore, the transmittance in the pixel is much increased. Furthermore, in the LCD and the method of fabricating the LCD according to the second embodiment of this document, a part of the finger section of the common electrode and the finger section of the pixel electrode are directly formed on the substrate. As a result, there are no gate insulating layer and the passivation layers and in the light transmitting area including the open block, and thereby the transmittance in the pixel is more increased.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

What is claimed is:

1. A liquid crystal display comprising:
   a gate line formed on a first substrate;
   a data line formed on the first substrate and intersecting the gate line to define a pixel area;
   a common line partially surrounding the pixel area and formed along with the gate line by a same process;
   a thin film transistor formed at the intersection of the gate line and the data line;
   a common electrode having a common electrode horizontal section connected to the common line, and a common electrode finger section extending from the common electrode horizontal section with a finger shape; and
   a pixel electrode connected to the thin film transistor and generating a horizontal electric field along with the common electrode,
   wherein a part of the common electrode finger section overlaps the data line with a first passivation layer having a low dielectric and placed between the common electrode and the data line,
   wherein the pixel electrode has a pixel electrode horizontal section connected to the thin film transistor, and a pixel electrode finger section extending from the pixel electrode horizontal section in parallel to the common electrode finger section with a finger shape,
   wherein the common electrode finger section has a first portion overlapping the data line and a second portion other than the first portion, and
   wherein the second portion of the common electrode finger section and the finger section of the pixel electrode are directly contacting the first substrate.

2. The liquid crystal display of claim 1, wherein the first passivation layer comprises acryl organic compound.

3. The liquid crystal display of claim 2, further comprising a second passivation layer made of an inorganic insulating material and placed between the data line and the first passivation layer.

4. The liquid crystal display of claim 1, further comprising a second substrate having a black matrix and arranged opposite to the first substrate, wherein the black matrix covers the data line but does not cover the common line arranged in parallel to the data line.

* * * * *